United States Patent
Fredrickson et al.

(10) Patent No.: US 8,639,726 B2
(45) Date of Patent: Jan. 28, 2014

(54) UNIFIED METHOD ARCHITECTURE

(75) Inventors: J. Todd Fredrickson, Rockledge, FL (US); Peter Haumer, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1719 days.

(21) Appl. No.: 11/238,550

(22) Filed: Sep. 29, 2005

(65) Prior Publication Data
US 2007/0073738 A1 Mar. 29, 2007

(51) Int. Cl.
*G06F 17/30* (2006.01)

(52) U.S. Cl.
USPC .......................................................... 707/802

(58) Field of Classification Search
USPC ............. 717/105, 104; 707/104.1, 802; 705/4
See application file for complete search history.

(56) References Cited

U.S. PATENT DOCUMENTS

| | | | | |
|---|---|---|---|---|
| 5,446,653 | A * | 8/1995 | Miller et al. | 705/4 |
| 5,995,969 | A | 11/1999 | Lee et al. | |
| 6,170,081 | B1 | 1/2001 | Fontana et al. | |
| 6,601,233 | B1 * | 7/2003 | Underwood | 717/102 |
| 2002/0104068 | A1 | 8/2002 | Barrett et al. | |
| 2003/0120593 | A1 * | 6/2003 | Bansal et al. | 705/39 |
| 2004/0015822 | A1 | 1/2004 | Linton et al. | |
| 2004/0031014 | A1 | 2/2004 | Baecker et al. | |
| 2004/0083448 | A1 | 4/2004 | Schulz et al. | |
| 2004/0088678 | A1 | 5/2004 | Litoiu et al. | |
| 2004/0093581 | A1 | 5/2004 | Nielsen et al. | |
| 2004/0187089 | A1 * | 9/2004 | Schulz | 717/101 |
| 2005/0022157 | A1 * | 1/2005 | Brendle et al. | 717/104 |
| 2006/0020913 | A1 * | 1/2006 | Holt | 717/104 |
| 2007/0180424 | A1 * | 8/2007 | Kazakov et al. | 717/104 |

OTHER PUBLICATIONS

Wikipedia, "Unified Modeling Language" Oct. 7, 2008, Wikipedia. org, p. 1-9.*
Goulao, Miguel et al, *Formalizing metrics for COTS*.
Elizondo, Eng. Javier et al, *Modeling a CMM Implementation Method with SPEM*, http://scom.hud.ac.uk/scomzl/conference/chenhua/04052801E/SER2535.pdf.
Ribo, Josep, et al, *A Two-tiered Methodology to Extend the UML Metamodel*, http://www.lsi.upc.es/dept/techreps/ps/R02-52.pdf.
Alanen, Marcus, et al, *Model Driven Engineering: A Position Paper*, http://www.di.uminho.pt~mompes/2004/apers/alanen.pdf.
Bezlivin, Jean, et al, *A Preliminary Identification of MDA Components*, http://www.softmetaware.com/oopsla2002/bezivinj.pdf.
Bezivin, Jean, et al, *Reflective Model Driven Engineering*, http://www.irisa.fr/triskell/publis/2003/bezivin03.pdf.
Hawker, Scott, *Moving Software Engineering to the Future*, The University of Alabama, http://cs.ua.edu/SEL/publications/pitch%202001-10-04.pdf.
*Software Process Engineering Metamodel Specifiation*, Jan. 2005, Version 1.1, http://www.omg.org/docs/formal/05-01-06.pdf.
*The Software Process Engineering Metamodel—Summary of changes for revised submission Jun. 2001*, http://nepture.irit.fr/biblio/01-06-06.pdf.

* cited by examiner

*Primary Examiner* — Etienne Leroux
(74) *Attorney, Agent, or Firm* — Steven M. Greenberg, Esq.; Carey, Rodriguez, Greenberg & O'Keefe

(57) ABSTRACT

Embodiments of the invention provide a method, system and computer program product for methods management. A methods management method can include establishing default structured relationships between different reusable method elements. The methods management method also can include creating descriptors within a process that mirror the default structured relationships. Finally, the methods management method can include configuring the created descriptors to permit changes to the mirrored default structural relationships between the created descriptors in the process without changing the default structured relationships between the source reusable method elements.

18 Claims, 3 Drawing Sheets

UNIFIED METHOD ARCHITECTURE

BACKGROUND OF THE INVENTION

1. Field of the Invention

The present invention relates to the field of conceptual frameworks and tool support for the management of methods and processes, and more particularly to the systematic management of libraries of related method content and processes.

2. Description of the Related Art

A method architecture describes a schema for organizing large amounts of descriptions for development methods and processes, such as software engineering, mechanical engineering, business transformation, sales cycles and the like. A development method provides step-by-step explanations for a particular way of achieving a specific development goal under general circumstances such as transforming a requirements document into an analysis model, defining an architectural mechanism based on functional and non-functional requirements, creating a project plan for a development iteration, defining a quality assurance plan for functional requirements, or redesigning a business organization based on a new strategic direction.

A development process takes several of these methods and combines method steps into semi-ordered sequences creating a structure that is specific to temporal development circumstances such as how work is to be organized over time. The structure also can be specific to one type of development project, for instance the characteristics of the development project including development software for an online system versus software and hardware for an embedded system. A process is defined based on a lifecycle, which specifies how method elements such as tasks are being applied and work products are being produced over time by particular roles within the process.

Presently, there are several frameworks available in industry for the documentation of methods and the specification of processes. Commercial method and process management products include the Rational Unified Process Workbench manufactured by IBM Corporation of Armonk, N.Y., United States. International standards for schemas for method and process management systems also exist. The most widely know standard of this field is the Software Process Engineering Meta-Model (SPEM) version 1.1 released by the Object Management Group (OMG).

These frameworks have been widely deployed for use in the enterprise. Yet, each has a different architecture and usage. Moreover, none are compatible with one another. For instance, each has different and sometimes overlapping content, different structures for the content elements, different use terms and content descriptions, and enabling tools and toolsets that are constructed using multiple platforms and technologies. Thus, end users must purchase and utilize separate method sets as the individual architectures of the methods frameworks make it impossible to integrate the frameworks together. In consequence, consumers have become confused as to what practices are to be used when developing enterprise applications.

BRIEF SUMMARY OF THE INVENTION

Embodiments of the present invention address deficiencies of the art in respect to method and process management, and provide a novel and non-obvious methods management system, method management method, and computer program product. In accordance with the present invention, a method management tool can be utilized to produce a process built using source reusable method elements tied to a process through descriptors. The delivery process can include a unique structuring of phases, iterations, activities with descriptors corresponding to a default arrangement of the source reusable method elements. Importantly, changes to the descriptors and the linkages can allow the process to differ from other processes using the same source reusable method elements.

In one embodiment of the invention, a method management tool configured to produce a process using descriptors can include source reusable method elements and an arrangement of descriptors mirroring default structural relationships of the source reusable method elements. As an example, each of the source reusable method elements can be one of a task, a role and a work product. Each of the descriptors can be configured to permit changes to the arrangement between the descriptors without changing the default structured relationships of the source reusable method elements.

In an aspect of the embodiment, each of the descriptors in the arrangement inherits from breakdown elements. In this regard, the method management tool further can include an activity including an aggregation of breakdown elements in a work breakdown structure. For instance, the activity can include one of a phase and an iteration. Finally, the method management tool also can include a wizard enabled to synchronize changes between the source reusable method elements and the descriptors.

In another embodiment of the invention, a computer-implemented methods management method can be provided. The methods management method can include establishing default structured relationships between different reusable method elements. The methods management method also can include creating descriptors within a process that mirror the default structured relationships. Finally, the methods management method can include configuring the created descriptors to permit changes to the mirrored default structural relationships between the created descriptors in the process without changing the default structured relationships between the source reusable method elements.

In one aspect of the instant embodiment, creating descriptors within a process that mirror the default structured relationships can include creating descriptors within one of a capability pattern, process contribution, planning template and delivery process that mirror the default structured relationships. In another aspect of the instant embodiment, the method further can include inheriting the descriptors from a breakdown element. As such, the method can include aggregating a plurality of breakdown elements in a work breakdown structure to produce an activity in the process.

In another aspect of the instant embodiment, configuring the created descriptors to permit changes to the mirrored default structural relationships between the created descriptors in the process without changing the default structured relationships between the source reusable method elements, further can include configuring the created descriptors to permit changes to attributes of the created descriptors in the process without changing attributes for the source reusable method elements. Correspondingly, in yet another aspect of the instant embodiment, configuring the created descriptors to permit changes to the mirrored default structural relationships between the created descriptors in the process without changing the default structured relationships between the source reusable method elements, further can include further configuring the created descriptors to synchronize changes in the source reusable method elements with the descriptors.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for methods management. In accordance with an embodiment of the present invention, a methods management method, system and computer program product defines a set of modeling semantics and an architecture for arranging method elements such as roles, tasks and work product, in order to enforce a separation of method definition with method content from the development process application of these methods. Referred to as descriptors, these entities mirror method elements in corresponding processes which allows the flexibility of adapting different method elements dynamically in different processes.

More specifically, method content can be separated from its application in a process. Method content describes what is to be produced, the necessary skills required and provides step-by-step explanations, describing how specific goals are achieved, all independent of the placement of these steps items within a process lifecycle. Processes utilize method content by relating method content into semi-ordered sequences that are customized to specific types of projects. In the present invention, method content can be separated from its application in a process through the use of descriptors in the process which refer to the method content, but which can be modified without affecting the method content.

A descriptor can be characterized as a reference object for one particular content element, which has its own relationships and properties. When a descriptor is created it can be provided with congruent copies of the relationships defined for the referenced content element. However, these relationships can be modified for the particular process situation for which the descriptor has been created. In this way, the use of descriptors allows each process to reference common method guidance from a common method content pool, which then makes up the actual process guidance. Because of these references, changes in the methods will automatically be reflected in all processes using it.

Figure 1:
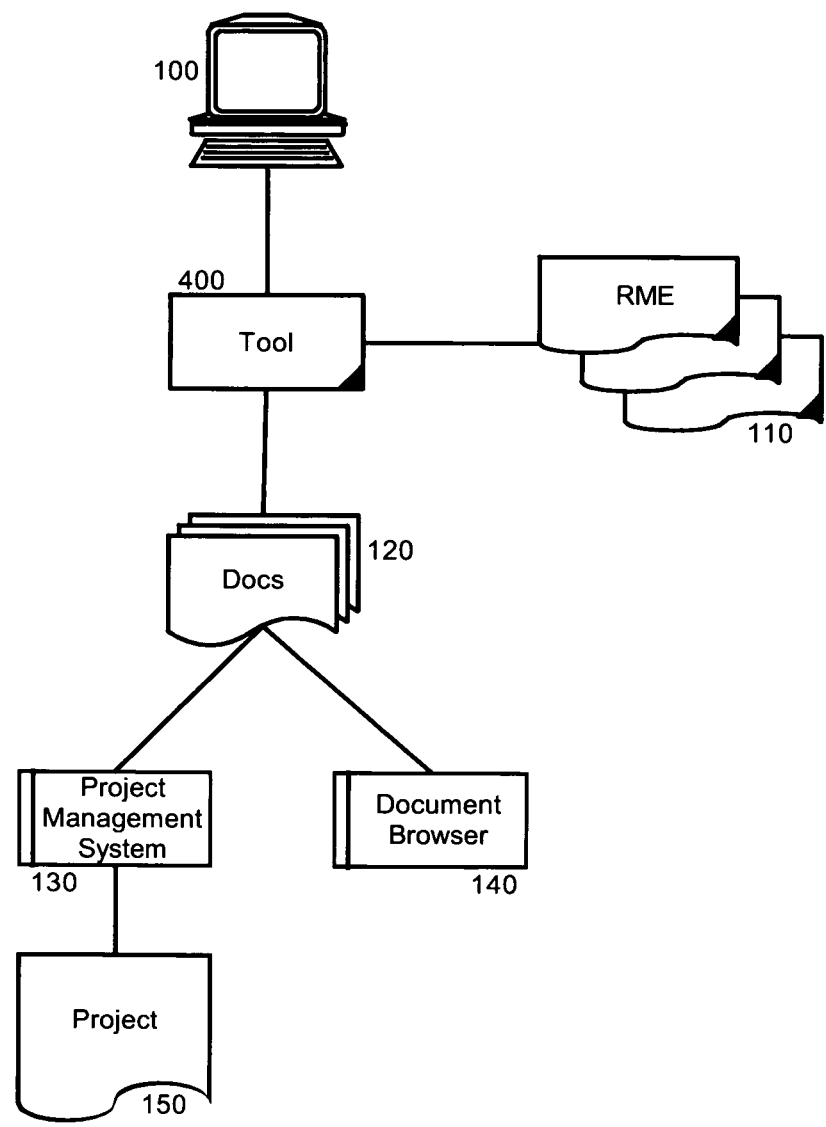
FIG. 1 is a schematic illustration of a methods management system configured to decouple method elements from a delivery process in a methods framework.

In more particular illustration, FIG. 1 is a schematic illustration of a methods management system configured to couple method elements with a process in a method library. Referring to FIG. 1, a computing platform 100 can host a methods management tool 400. The methods management tool 400 can arrange reusable methods elements 110 to produce one or more documents 120. The documents 120 can provide a description of a process and can be viewed within a document browser 140. Alternatively, the documents 120 can be provided as input to a project management system 130 to produce a project plan 150.

Advantageously, the methods management tool 400 can include program code enabled to facilitate the use of the reusable method elements 110 in the process described by the documents 120. As an example, each of the source reusable method elements 110 can be one of a task, a role and a work product. The process can be defined by an arrangement of descriptors that mirror default structural relationships of the source reusable method elements 110. Each of the descriptors further can be configured to permit changes to the arrangement between the descriptors without changing the default structured relationships of the source reusable method elements 110. Moreover, while the underlying roles, tasks and work product can change, the relationship between the descriptors representing the usage of roles, tasks and work product in the process can remain constant.

More specifically, once a set of relationships of roles, tasks and work product have been established in a delivery process, changing the default relationships does not change the relationships between descriptors. Yet, changes to the attributes of the roles, tasks and work product can be propagated to the descriptors. Notwithstanding, the use of a different set of descriptors to define a new set of relationships between roles, tasks and work product in a delivery process does not affect those relationships which already are defined. Thus, an arrangement of descriptors can mirror default structural relationships of source reusable method elements.

Each of the descriptors can be configured to permit changes to the arrangement between the descriptors without changing the default structured relationships of the source reusable method elements. A wizard enables the synchronization of changes between source reusable method elements and corresponding descriptors. The wizard provides a user interface through which synchronization rules can be applied for changes as between the source reusable method elements and the descriptors.

Figure 2:
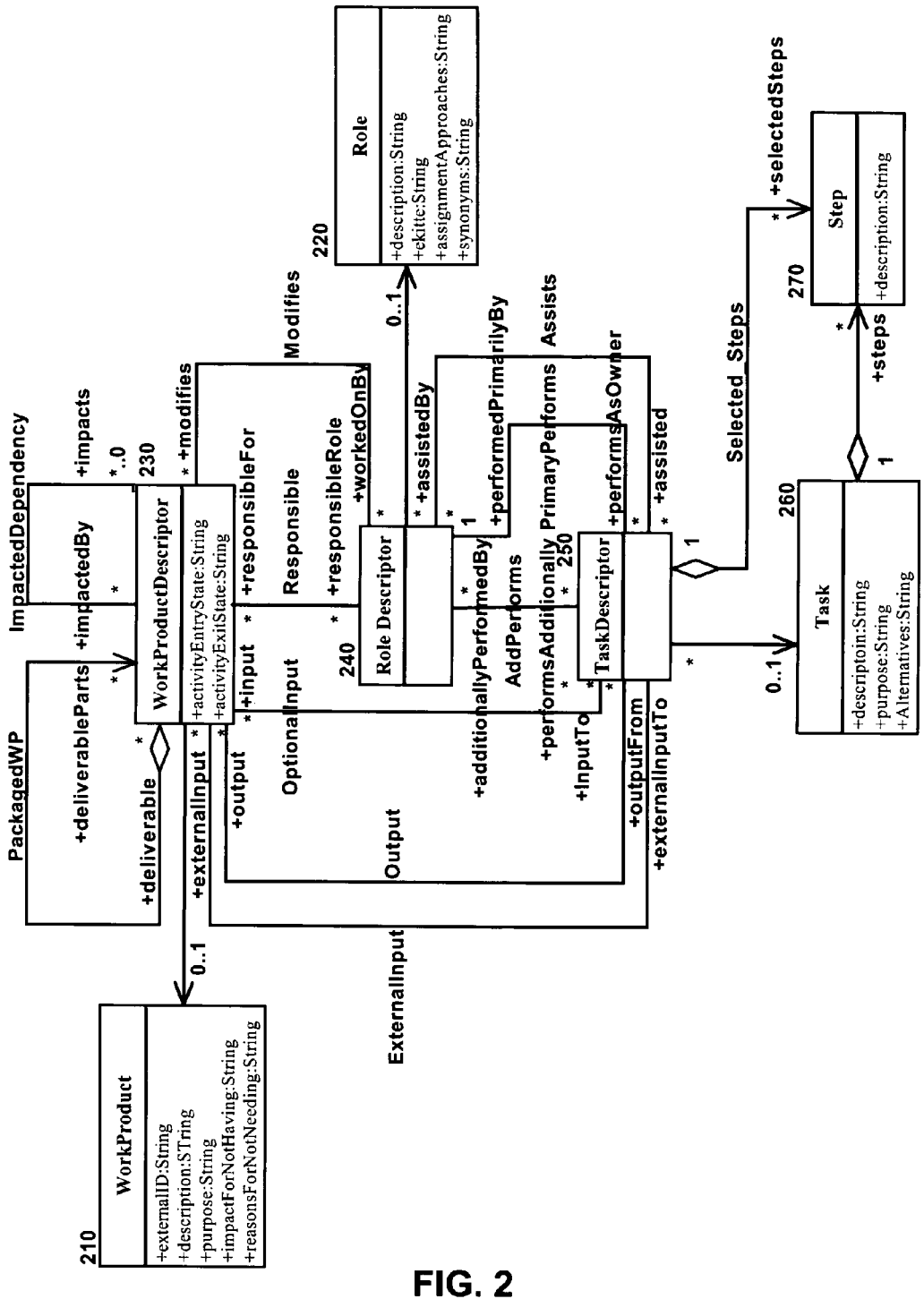
FIG. 2 is a class diagram of the unified method architecture showing reusable method elements linked to descriptors; and, FIG. 3 is a class diagram of the unified method architecture showing how descriptors are parts of breakdown structures.

In more particular explanation, FIG. 2 is a class diagram of reusable method elements linked to descriptors. As shown in FIG. 2, a task 260 can be represented in a process by a task descriptor 250 which task 260 can include an aggregation of one or more steps 270. Likewise, a role 220 can be represented by a role descriptor 240. Finally, a work product 210 can be represented by a work product descriptor 230. The role descriptor 240 can include associations to task descriptors 250 performed by an associated role 220. Also, the role descriptor 240 can include associations to work product descriptors 230 for which an associated role 220 is responsible. Finally, the work product descriptor 230 and the task descriptor 250 can include associations to indicate input to and output from tasks 260 associated with corresponding task descriptors 250.

The use of descriptors allows each process to reference common method guidance from a common method content pool, which then can be arranged to form actual process guidance. Because of the references afforded by the descriptors, changes in the method contents can optionally be reflected in all processes using the method contents. In addition, descriptors allow overwriting the relationships expressed with method content within a process as well as defining individual process-specific relationships for each process element such as work breakdown and new relations to work products and roles.

Figure 3:
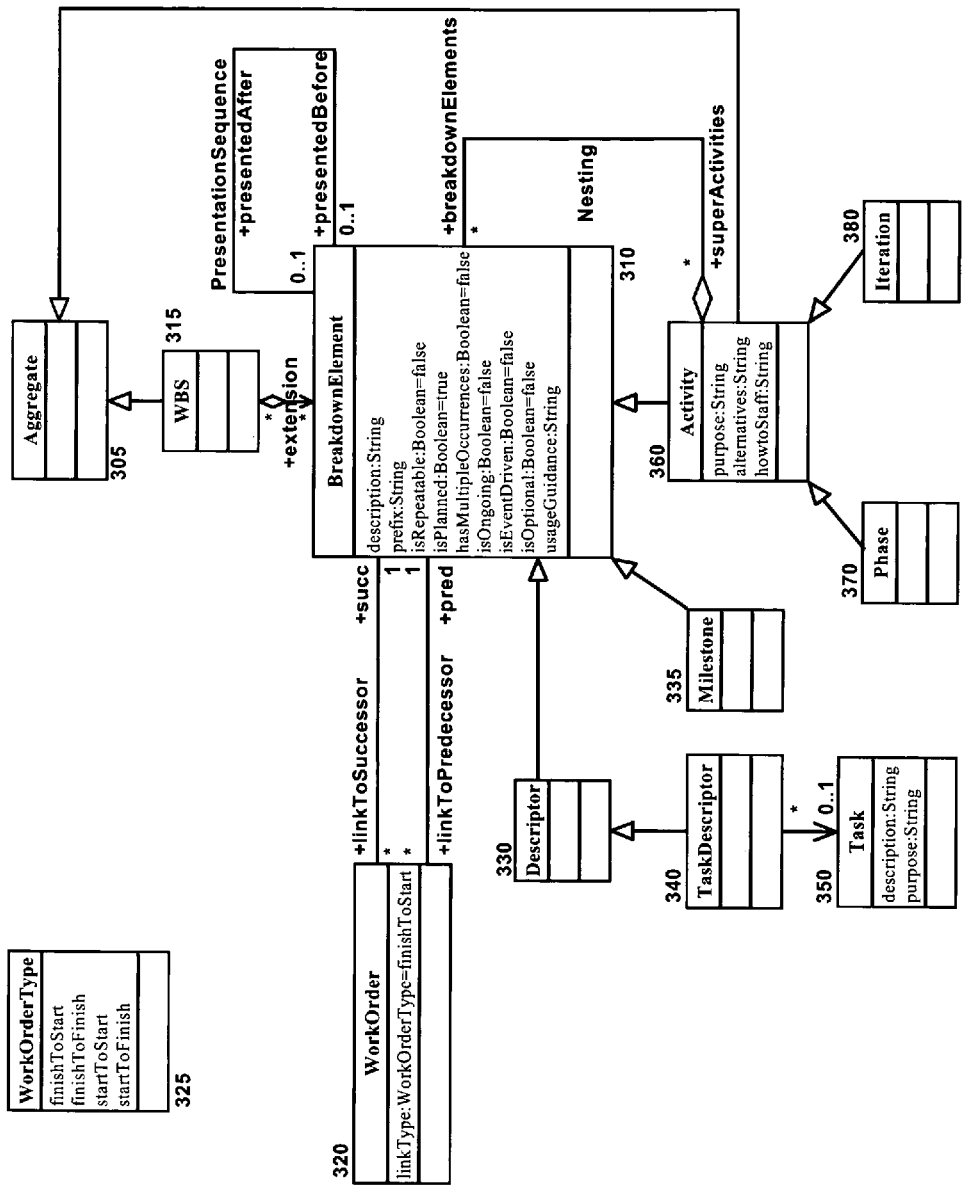

In more particular illustration, FIG. 3 is a class diagram of the unified method architecture depicting its representation of breakdown structure. A task descriptor 340 can be provided which can be associated with a task 350 and which generalizes a descriptor 330 which further generalizes the breakdown element 310 in the work breakdown structure (WBS) 315. Each breakdown element 310 can include one or more work orders 320 having a work order type 325, each of the work orders 320 being linked together in the breakdown element 310 and defining the sequence in which breakdown elements 310 are performed. Higher level breakdown elements 310 such as milestones 335 can be part of a breakdown as well.

Notably, in the WBS 315 shown in FIG. 3, a central structural element can be an activity 360 specialization of a breakdown element 310. An activity 360 can be used to group together, or aggregate 305, any breakdown element 310 such as task descriptors 340 and other activities 360. Two subtypes of activity 360 can be defined—a phase 370 and an iteration 380. However, while multiple relationships between phases 370 and iterations 380 can be permitted by the unified method architecture of the present invention, neither are mandatory elements within a development process.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method management tool configured to produce a process using descriptors comprising:
    a computing platform comprising memory and at least one processor and a method management tool configured for producing a process using a plurality of descriptors executing therein;
    a plurality of source reusable method elements of the method management tool; and,
    an arrangement of descriptors loaded in memory, the arrangement of descriptors mirroring default structural relationships of the plurality of source reusable method elements, each one of the plurality of descriptors in the arrangement of descriptors being further configured to permit changes to said arrangement of descriptors between the plurality of descriptors without changing as a result said default structured relationships of said plurality of source reusable method elements.

2. The method management tool of claim 1, wherein each of said plurality of source reusable method elements comprises one of a task, a role and a work product.

3. The method management tool of claim 1, wherein each one of said plurality of descriptors in said arrangement inherits from a breakdown element.

4. The method management tool of claim 3, further comprising an activity comprising an aggregation of breakdown elements in a work breakdown structure.

5. The method management tool of claim 4, wherein said activity comprises one of a phase and an iteration.

6. The method of claim 1, further comprising a wizard enabled to synchronize changes between said plurality of source reusable method elements and said plurality of descriptors.

7. A computer-implemented methods management method comprising:
    identifying default structured relationships between different reusable method elements in a methods management tool configured for producing a process using a plurality of different descriptors executing in memory of a computer;
    setting the plurality of different descriptors for each of the different reusable method elements;
    arranging by the computer the plurality of different descriptors within the process so that the arrangement mirrors said default structured relationships; and,
    configuring by the computer said plurality of different descriptors to permit changes to said mirrored default structural relationships between said plurality of different descriptors in said process without changing said default structured relationships between said different reusable method elements.

8. The method of claim 7, wherein said arranging by the computer the plurality of different descriptors within the process that mirror said default structured relationships, comprises arranging the plurality of different descriptors within one of a capability pattern, process contribution, planning template and delivery process that mirror said default structured relationships.

9. The method of claim 7, wherein said configuring by the computer said plurality of different descriptors to permit changes to said mirrored default structural relationships between said created descriptors in said process without changing said default structured relationships between said different reusable method elements, further comprises configuring said plurality of different descriptors to permit changes to attributes of said plurality of different descriptors in said process without changing attributes for said different reusable method elements.

10. The method of claim 7, wherein said configuring by the computer said plurality of different descriptors to permit changes to said mirrored default structural relationships between said plurality of different descriptors in said process without changing said default structured relationships between said different reusable method elements, further comprises further configuring said plurality of different descriptors to synchronize changes in said different reusable method elements with said plurality of different descriptors.

11. The method of claim 7, further comprising inheriting said plurality of different descriptors from a breakdown element.

12. The method of claim 11, further comprising aggregating a plurality of breakdown elements in a work breakdown structure to produce an activity in said process.

13. A computer program product comprising a non-transitory computer usable storage medium storing computer usable program code for methods management configured for producing a process using a plurality of different descriptors, said computer program product including:
computer usable program code for identifying default structured relationships between different reusable method elements;
computer usable program code for setting the plurality of different descriptors for each of the different reusable method elements;
computer usable program code for arranging the plurality of different descriptors within the process so that the arrangement mirrors said default structured relationships; and,
computer usable program code for configuring said plurality of different descriptors to permit changes to said mirrored default structural relationships between said plurality of different descriptors in said process without changing said default structured relationships between said different reusable method elements.

14. The computer program product of claim 13, wherein said computer usable program code for arranging the plurality of different descriptors within the process that mirrors said default structured relationships, comprises computer usable program code for arranging the plurality of different descriptors within one of a capability pattern, process contribution, planning template and delivery process that mirrors said default structured relationships.

15. The computer program product of claim 13, wherein said computer usable program code for configuring said plurality of different descriptors to permit changes to said mirrored default structural relationships between said plurality of different descriptors in said process without changing said default structured relationships between said different reusable method elements, further comprises computer usable program code for configuring said plurality of different descriptors to permit changes to attributes of said plurality of different descriptors in said process without changing attributes for said different reusable method elements.

16. The computer program product of claim 13, wherein said computer usable program code for configuring said plurality of different descriptors to permit changes to said mirrored default structural relationships between said plurality of different descriptors in said process without changing default structured relationships between said different reusable method elements, further comprises computer usable program code for further configuring said plurality of different descriptors to synchronize changes in said different reusable method elements with said plurality of different descriptors.

17. The computer program product of claim 13, further comprising computer usable program code for inheriting said plurality of different descriptors from a breakdown element.

18. The computer program product of claim 17, further comprising computer usable program code for aggregating a plurality of breakdown elements in a work breakdown structure to produce an activity in said process.

* * * * *